(12) United States Patent
Shea

(10) Patent No.: US 10,907,313 B1
(45) Date of Patent: Feb. 2, 2021

(54) TEMPORARY TAPE REMOVAL HUB FOR TAPE REMOVAL MACHINE

(71) Applicant: James P. Shea, Waterford, MI (US)

(72) Inventor: James P. Shea, Waterford, MI (US)

( * ) Notice: Subject to any disclaimer, the term of this patent is extended or adjusted under 35 U.S.C. 154(b) by 0 days.

(21) Appl. No.: 16/657,706

(22) Filed: Oct. 18, 2019

(51) Int. Cl.
| | |
|---|---|
| *B32B 43/00* | (2006.01) |
| *B62D 63/04* | (2006.01) |
| *B65H 18/10* | (2006.01) |
| *B65H 18/02* | (2006.01) |
| *E01C 23/06* | (2006.01) |
| *E01C 23/088* | (2006.01) |
| *B65H 29/00* | (2006.01) |
| *B65H 18/04* | (2006.01) |

(52) U.S. Cl.
CPC .......... *E01C 23/088* (2013.01); *B32B 43/006* (2013.01); *B65H 18/026* (2013.01); *B65H 18/028* (2013.01); *B65H 18/10* (2013.01); *B65H 29/008* (2013.01); *B65H 18/04* (2013.01); *B65H 2402/42* (2013.01); *B65H 2701/1922* (2013.01); *Y10T 156/1174* (2015.01); *Y10T 156/195* (2015.01); *Y10T 156/1978* (2015.01)

(58) Field of Classification Search
CPC .... B65H 18/028; B65H 18/026; B65H 18/10; Y10T 156/1174; Y10T 156/195; H01F 41/098
USPC ...................................................... 242/437.3
See application file for complete search history.

(56) References Cited

U.S. PATENT DOCUMENTS

| | | | | | |
|---|---|---|---|---|---|
| 1,357,345 | A | * | 11/1920 | Phelps .................... | B65H 75/10 242/586.4 |
| 1,359,021 | A | * | 11/1920 | Blair ....................... | B65H 18/10 242/533.7 |
| 1,372,484 | A | * | 3/1921 | Cornwall ............... | B29D 30/38 242/611.2 |
| 1,524,483 | A | * | 1/1925 | Lowe ...................... | B65H 75/10 242/613.5 |
| 1,539,833 | A | * | 6/1925 | Fahrenwald ............ | F27D 3/026 432/246 |
| 1,775,610 | A | * | 9/1930 | Weiss .................... | G03B 21/321 242/597.6 |
| 2,388,598 | A | * | 11/1945 | Cahill ................... | H01F 41/098 29/605 |
| 2,664,194 | A | | 7/1950 | Sharp | |
| 2,663,513 | A | | 11/1951 | Hermann et al. | |
| 2,860,766 | A | | 5/1956 | Welter | |
| 3,141,632 | A | * | 7/1964 | Spitz ......................... | H01F 5/02 242/118.6 |
| 3,486,543 | A | * | 12/1969 | Nishimura ............... | B27B 25/02 144/250.1 |
| 3,571,878 | A | * | 3/1971 | Alderfer ................ | B65H 75/08 492/50 |
| 3,633,236 | A | * | 1/1972 | Scruggs ............... | A46B 13/006 15/182 |

(Continued)

FOREIGN PATENT DOCUMENTS

| | | | | |
|---|---|---|---|---|
| FR | 2158721 | A5 * | 6/1973 | ............. B65H 75/02 |
| WO | WO 2000/012910 | | 3/2000 | |

*Primary Examiner* — Mark A Osele

(57) ABSTRACT

A tape removal hub for a temporary tape removing apparatus which includes a hub plug having a noncircular through bore complementarily shaped to receive the noncircular shaft portion of a spool spindle shaft of the temporary tape removing apparatus and a length of pipe or tubing into which the hub plug is inserted.

18 Claims, 8 Drawing Sheets

(56) References Cited

U.S. PATENT DOCUMENTS

| | | | | |
|---|---|---|---|---|
| 3,830,441 A | * | 8/1974 | McQuiston | E04D 13/1618 |
| | | | | 254/222 |
| 3,840,194 A | * | 10/1974 | Vetter | B65H 75/185 |
| | | | | 242/613.5 |
| 4,131,242 A | * | 12/1978 | Flores | B65H 75/08 |
| | | | | 242/118.3 |
| 4,161,298 A | * | 7/1979 | Davis | B65H 18/10 |
| | | | | 242/530.3 |
| 4,384,685 A | * | 5/1983 | Pitts | B65H 75/10 |
| | | | | 242/118.3 |
| 4,473,198 A | | 9/1984 | Pertzsch et al. | |
| 4,562,497 A | | 12/1985 | Morinaga et al. | |
| 4,564,156 A | | 1/1986 | Cybulski | |
| 4,754,537 A | * | 7/1988 | Lee | B29C 65/565 |
| | | | | 29/895.212 |
| 4,852,230 A | * | 8/1989 | Yu | B65G 39/09 |
| | | | | 29/898.07 |
| 4,919,358 A | * | 4/1990 | Innocenti, Sr. | B65H 75/10 |
| | | | | 242/610.5 |
| 5,131,534 A | | 7/1992 | Brown et al. | |
| 5,174,840 A | * | 12/1992 | Anderson | B29C 66/71 |
| | | | | 156/69 |
| 5,535,961 A | * | 7/1996 | Duckworth | B65H 75/10 |
| | | | | 242/586.2 |
| 5,600,294 A | | 2/1997 | Buenconsejo et al. | |
| 6,405,974 B1 | * | 6/2002 | Herrington | B29C 53/14 |
| | | | | 242/609.4 |
| 6,766,588 B1 | | 7/2004 | Hsu | |
| 6,830,211 B2 | * | 12/2004 | Sloan | B65H 75/242 |
| | | | | 242/573.1 |
| 7,195,222 B2 | | 3/2007 | Dent | |
| 7,299,846 B2 | * | 11/2007 | Peirce | B29C 63/0013 |
| | | | | 156/717 |
| 8,770,509 B2 | * | 7/2014 | Tzur | B65H 75/143 |
| | | | | 242/613.5 |
| 10,112,794 B1 | * | 10/2018 | Shea | E01C 23/08 |
| 10,647,542 B2 | * | 5/2020 | Rodgers | B41M 3/00 |
| 2002/0092941 A1 | * | 7/2002 | Henderson | A47J 42/50 |
| | | | | 241/169.1 |
| 2011/0266385 A1 | * | 11/2011 | Reggiani | B65H 26/04 |
| | | | | 242/546 |
| 2012/0273602 A1 | * | 11/2012 | Sperry | B65H 75/246 |
| | | | | 242/412 |

\* cited by examiner

TEMPORARY TAPE REMOVAL HUB FOR TAPE REMOVAL MACHINE

BACKGROUND

The present invention relates to the removal of marking tapes that function as lane dividers on roads, airport runways, parking lots, bicycle paths or other paved surfaces. More particularly the present invention relates to tape removal hubs for machines that are designed to remove such marking tapes from roads, airport runways, parking lots, bicycle paths and other paved surfaces.

Often during the construction, reconstruction, repair or maintenance of paved surfaces, mobile or pedestrian travel patterns must be shifted or redirected to allow for uninterrupted and safe movements through such project sites. Before the introduction of removable tapes, permanent marking paints/materials were used. Removal of such permanent markings is a slow operation. Among the methods used to remove permanent markings are grinding, milling, shot blasting, sand blasting and water blasting. Each of these removal methods causes undesirable damage to the paved surfaces.

Removable temporary marking tapes were developed in the late 1970's to the early 1980's. The quality of these tapes has improved continually. Initial application of these removable marking tapes was slow and labor intensive. Over time methods of applying these removable tapes have improved, lowering the amount of physical labor and time required to apply them.

Removing removable temporary marking tapes has always been a slow and extremely physical process. The labor involved is slow, exhaustive and demoralizing and places workers in hazardous situations. Many injuries have occurred. A limited number of machines have been developed to mechanize temporary marking tape removal, none of which have been practical. None have been effective. In fact, over the almost 30 years since introduction of temporary marking tapes, no removal machine has ever been produced commercially for sale or use that functions adequately. There has been a long felt need for a functional marking tape removal machine that can facilitate the removal of temporary pavement markings from paved surfaces.

Temporary marking tape used as lane markings is generally supplied in rolls. The rolls vary in length, width and weight. Standard widths can be 4 inches, 6 inches, 7 inches, 8 inches or 12 inches wide and can weigh up to 70 pounds per roll.

Structurally, temporary marking tape includes a top coat, internal netting and an adhesive. It is manufactured in stock rolls that can be from 36 to 42 inches wide and cut into standard usable widths. The stock rolls can be of varying length segments. The ends of adjacent segments of a roll are spliced together in a butt joint to produce a single roll having a desired overall length. When the required length of the tape roll is reached it is cut off and sent for further processing into appropriate widths. A roll of tape often includes multiple splices.

A combination of the top coat and netting provides the maxim pull strength of the tape. At butt joints between adjacent segments of a roll both the top coat and netting are severed. Splice material is used to join the ends of adjacent segments of the rolls together creating a joint area that is weaker than the uninterrupted segments of tape.

In addition to factory splices that join adjacent segments of rolls of tape, when the tape is applied on paved surfaces it is subject to stresses that cause weak points or areas of separation (breakage) to develop. Heavy traffic, turning movements by motor vehicles or construction vehicles can also damage tape and result in breakage. In some instances the damage to the tape can be so severe that it can only be removed manually. Applying the marking tape over expansion dams at bridges creates separation (breakage) of the tape at these areas. Wide pavement joints, heavily tined pavement, pot holes or other surface irregularities all are prone to cause separation (breakage). In any given length of temporary tape that is on a paved surface there can be many weakened points or points of separation (breakage).

Over the more than 35 years since the introduction or temporary marking tape no practical machine has been designed, developed or manufactured that can successfully remove temporary lane marking tapes. Challenges to designing and developing a suitable machine have to account for tape separations/breakage caused by vehicle turning movements, factory splices, wide pavement joints, heavy pavement tinning, texturing, pot holes, or surface irregularities. Since encountering long continuous, uninterrupted lengths of tape is seldom encountered in practice, any acceptable machine has to be able to efficiently remove lengths of tape that are subject to separation (breakage). In addition any machine design needs to be able to operate practically and safely in construction sites/zones in which construction and vehicular traffic flow can be hazardous.

The present inventor has recently been awarded U.S. Pat. No. 10,112,794 which is directed to a Motorized Tape Removal Apparatus (MTRA) that is designed and constructed to remove and handle temporary tape that has been removed in a manner that reduces the amount of labor and time it has taken in the past to remove and handle such tape. The entire disclosure of U.S. Pat. No. 10,112,794 is hereby expressly incorporated by reference. In addition to reducing the amount of time it has taken to handle and transfer removed tape into a dumpster, the present inventor's MTRA greatly reduces the volume of removed tape thereby requiring less dumpster space which reduces disposal costs.

The present inventor's patented MTRA is safe to operate, compact and is designed to efficiently remove marking lines that have multiple breaks or weakened points. In addition, the MTRA is configured to allow for the simultaneous removal of adjacent or abutting multiple lines of marking tape. In this regard, according to one embodiment the design, the MTRA allows for removable retainer discs to be positioned on the spindle shaft with disposable cores, so that the cores match the tape line widths of adjacent or abutting tape widths to be removed from a paved surface. For example two 4 inch wide lines of tape placed side by side could be removed simultaneously with two cores each matching a 4 inch line with a separation disc between the cores. In another example is a 4 inch line of tape placed on a paved surface next to a 6 inch line of tape could be removed simultaneously using cores matching a 4 inch line take up and a 6 inch line take up with a separation disc between the cores.

The present invention is directed to a spool spindle shaft and tape removal hub design than can be used with the present inventor's patented Motorized Tape Removal Apparatus (MTRA).

BRIEF SUMMARY

According to various features, characteristics and embodiments of the present invention which will become apparent as the description thereof proceeds, the present invention provides an improvement in a temporary tape removal apparatus that includes a chassis having fixed and guiding wheels, a boom arm extending outward from the chassis and being movable between up and down and side to side positions, a spool assembly including a rotatable spool assembly for winding used temporary tape thereon mounted on the boom arm, and controllable drive means to rotate the rotatable spool, the improvement wherein the rotatable spool assembly comprises:

a spool spindle shaft having a noncircular shaft portion; and a tape removal hub comprising a hub plug having a noncircular through bore complementarily shaped to receive the noncircular shaft portion of the spool spindle shaft and a length of pipe or tubing into which the hub plug is partially inserted.

The present invention further provides an assembly for winding temporary tape on a spool which comprises:

a rotatable spool spindle shaft having a noncircular shaft portion; and a tape removal hub comprising a hub plug having a noncircular through bore complementarily shaped to receive the noncircular shaft portion of the spool spindle shaft and a length of pipe or tubing into which the hub plug is partially inserted.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

The present invention provides for a spool spindle shaft and tape removal hub design that can be used with the present inventor's patented Motorized Tape Removal Apparatus (MTRA). The present inventor's patented MTRA has been determined to be useful to simultaneously remove multiple side by side or longitudinally abutting tape lines as well as multiple longitudinally separated tape lines. Other advantages provided by the present inventor's MTRA include allowing for faster and more efficient and safer removal of lines of tape while requiring fewer workers than manual removal methods, while eliminating inherent dangers associated with manual tape removal methods that places workers in hazardous situations.

Since patenting his MTRA, the present inventor has been testing temporary marking tapes that are available from several suppliers for use in marking lane dividers on roads, airport runways, parking lots, bicycle paths and other paved surfaces. Both the breaking and adhesive strengths of the various tapes were investigated as well as the conditions of different surfaces to which the tapes were applied and vehicular traffic the tapes were subjected to. It was determined that the amount of force to remove temporary marking tapes generally ranges greatly from about 8 pounds of force or less to about 30 pounds for a 4 inch wide tape. Within this range the necessary pulling force required to remove a modest length of tape can increase or spike quickly depending on the underlying surface conditions and vehicular traffic history as well as ambient temperatures.

Accordingly in order to accommodate dynamic changes in pulling forces required to remove standard lengths of temporary marking tapes, the present inventor has developed a spool spindle shaft and tape removal hub design that can be used with his MTRA.

In addition to addressing dynamic changes in pulling forces required to remove standard lengths of temporary marking tapes, the present inventor has determined that the spool spindle shaft and tape removal hub design of the present invention will allow removal of multiple lengths of temporary marking tapes which can total 100 to 200 pounds. Such weights necessitate a spool spindle shaft and tape removal hub design that enables workers to easily remove the heavy tape-loaded tape removal hubs from the spool spindle shaft in a safe and efficient manner.

From the above, it can be appreciated that the spool spindle shaft and tape removal hub of the present invention has to accommodate relatively large masses of removable tape while also accommodating dynamic changes in tape removal pulling forces.

Figure 1:
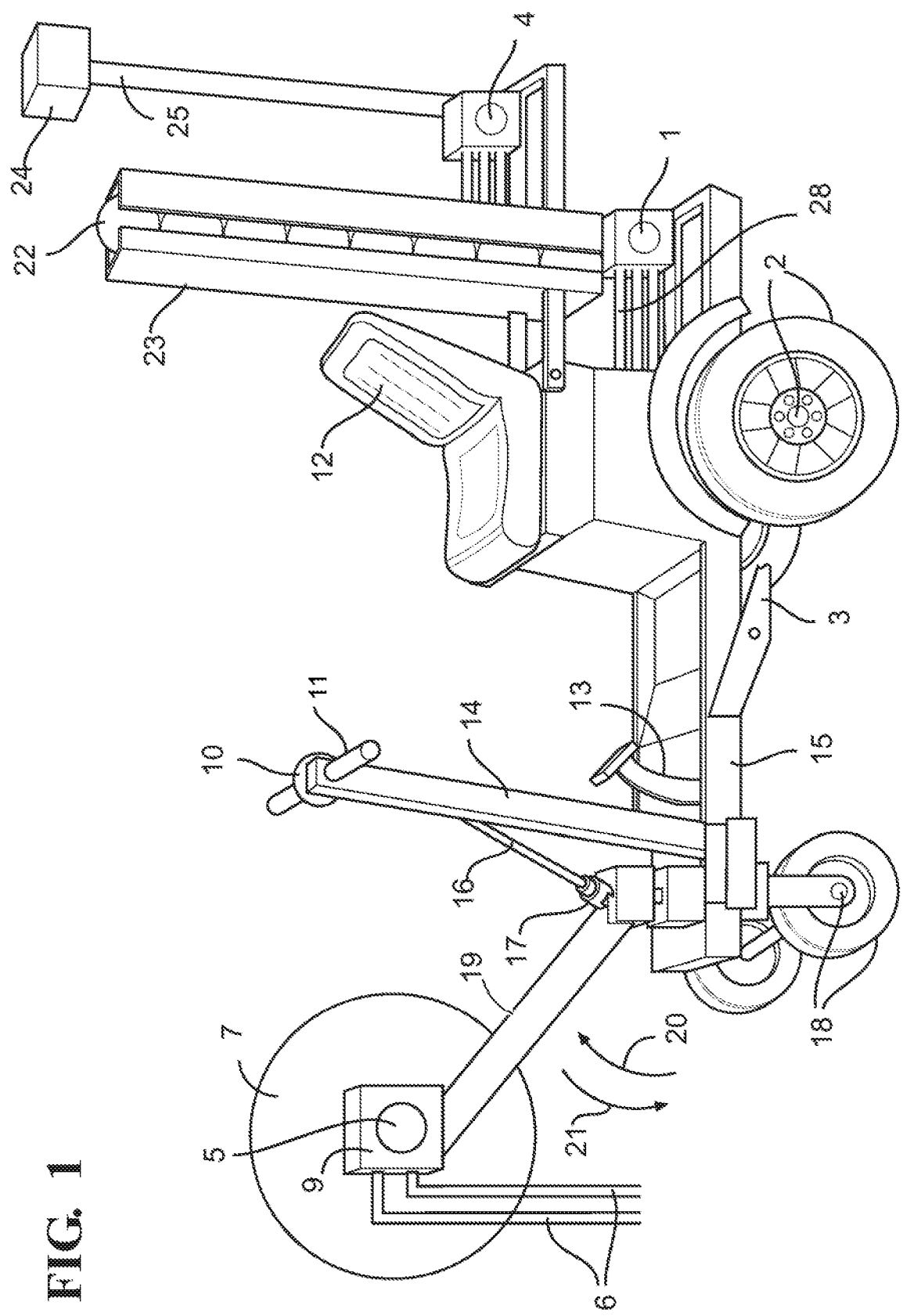
FIG. 1 is a left side view of the present inventor's patented MTRA.
Figure 2:
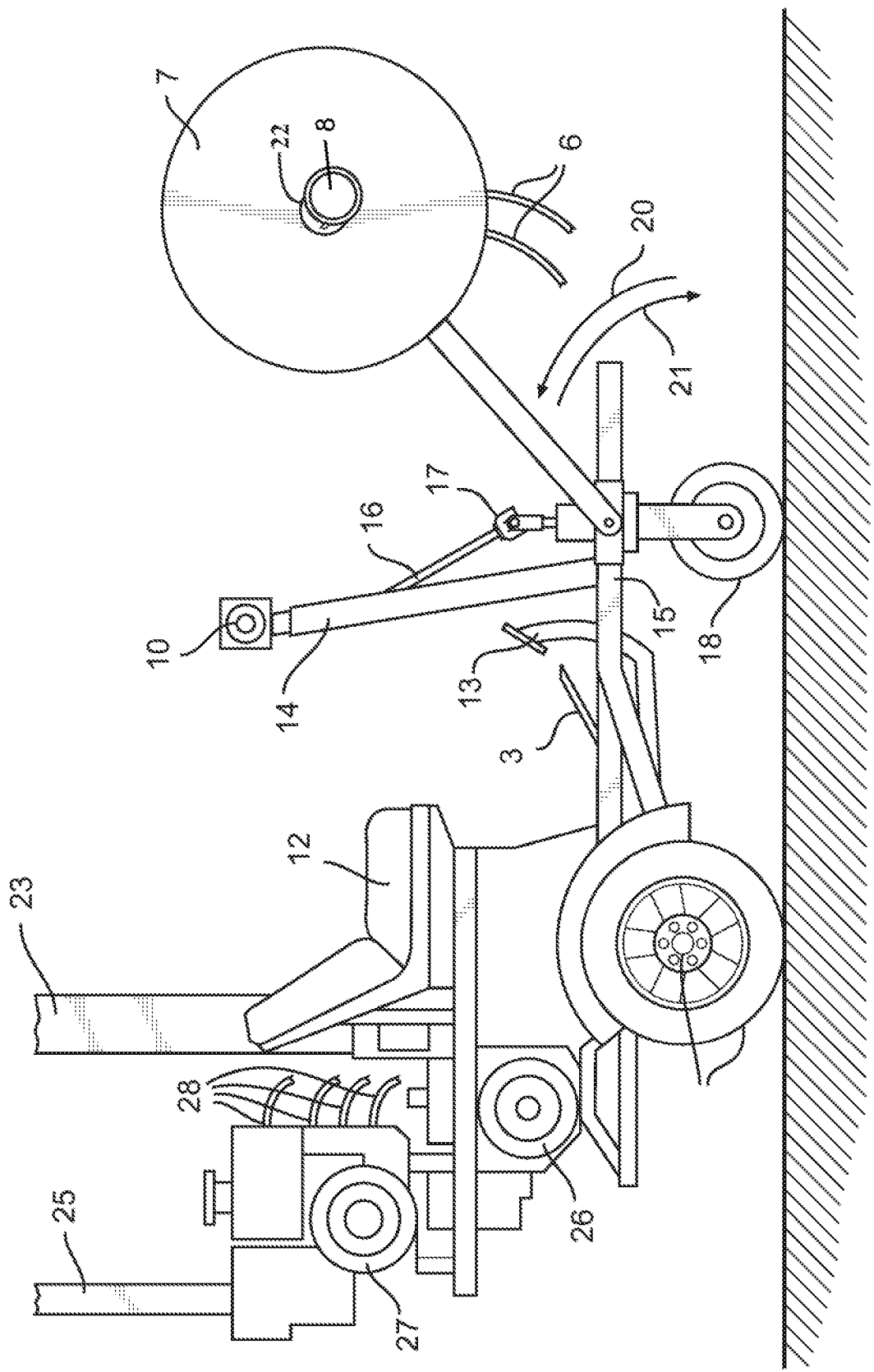
FIG. 2 is a right side view of these MTRA of FIG. 1

FIG. 1 is a left side view of the present inventor's patented MTRA. FIG. 2 is a right side view of the MTRA of FIG. 1. FIGS. 1 and 2 are provided herein to describe the environment for which the spool spindle shaft and tape removal hub of the present invention was developed and designed to be used with. The complete disclosure of the present inventor's U.S. Pat. No. 10,112,794 is hereby expressly incorporated by reference.

The MTRA is relatively short, narrow and compact for ease of handling, loading, transporting and safety during use in construction zones. The relatively small size and modest weight of the MTRA allow it to be easily loaded onto or off of a vehicle with a lift gate or driven onto or off a trailer. Further the relatively small size enables use of the MTRA in construction sites in a manner that avoids its use in paths of vehicular traffic or where construction equipment is being used or moved.

The hydraulic pump 1 is connected to an engine (not shown) and drives drive axle and rear wheels 2 forward and in reverse at variable speeds (or at rest in a neutral position) and is controlled by foot pedal 3. Hydraulic pump 4 is also connected to the engine (not shown) and drives hydraulic motor 5 so that pressure in hydraulic lines 6 rotate fixed inner retainer disc 7 and spool spindle 8 (FIG. 2) through a coupler inside of coupler body 9. Hydraulic motor 5 can be rotated clockwise or counterclockwise or be in a neutral position by throttle control 10 that can be similar to a rotational motorcycle style hand throttle controller, or other type of throttle controller. The throttle control 10 can be mounted on the right side of steering bar 11 or any other location that provides ease of use. It is to be understood that a single engine (not shown) can be used to drive hydraulic pumps 1 and 4 or separate engines (not shown) could be used. Alternatively a combination of mechanical drive systems and motors/engines could be used in place of the hydraulic pumps.

Speed and directional control of the invention is accomplished by a single operator sitting on seat 12. The invention is stopped by depressing brake pedal 13 which puts drive pump 1 in neutral and engages brakes that act on rear wheels 2. A steering column 14 is affixed to the frame or chassis 15 and has steering bar 11 at the top thereof. By rotating the steering bar 11 in a clockwise or counterclockwise rotary directional motion along the steering column 14 is transmitted through conventional bearings (not shown), steering shaft 16 and joint coupler 17 to the wheel axle assembly 18 directing movement of the MTRA to the left or right. Minor steering adjustments can be effectively accomplished to keep the MTRA in a straight alignment on a tape line for optimal removal speed. Spool spindle 8 (See FIG. 2) is attached at the distal end of boom arm 19 which can be lowered downward and raised upward are indicated by arrows 20 and 21.

Disposable cores 22 around which the removed tape is spooled during tape removal can be cardboard tubes of uniform diameter cut to length to match the line width of tape being removed are carried in core caddy 23. As discussed herein, the present invention replaces the previously used cores with tape removal hubs which also can be carried in a similar caddy.

A flashing beacon 24 is mounted at an elevation above the operator's head on upright tube 25 such that it can be seen from both oncoming and overtaking traffic for purposes of safety.

FIG. 2 is a right side view of the MTRA of FIG. 1 with the boom spool assembly in an right up position with the outside retainer disc described in U.S. Pat. No. 10,112,794 removed so as to show the spool spindle 8. According to the embodiment of the invention shown in FIG. 2 engine 26 drives hydraulic pump 1 that controls the bidirectional and variable speed drive axle/wheels and engine 27 that drives the hydraulic pump 4 that drives the bidirectional and variable speed hydraulic motor that controls the rotation of spool spindle 8. Various hydraulic lines 6 and 28 are shown.

Figure 3:
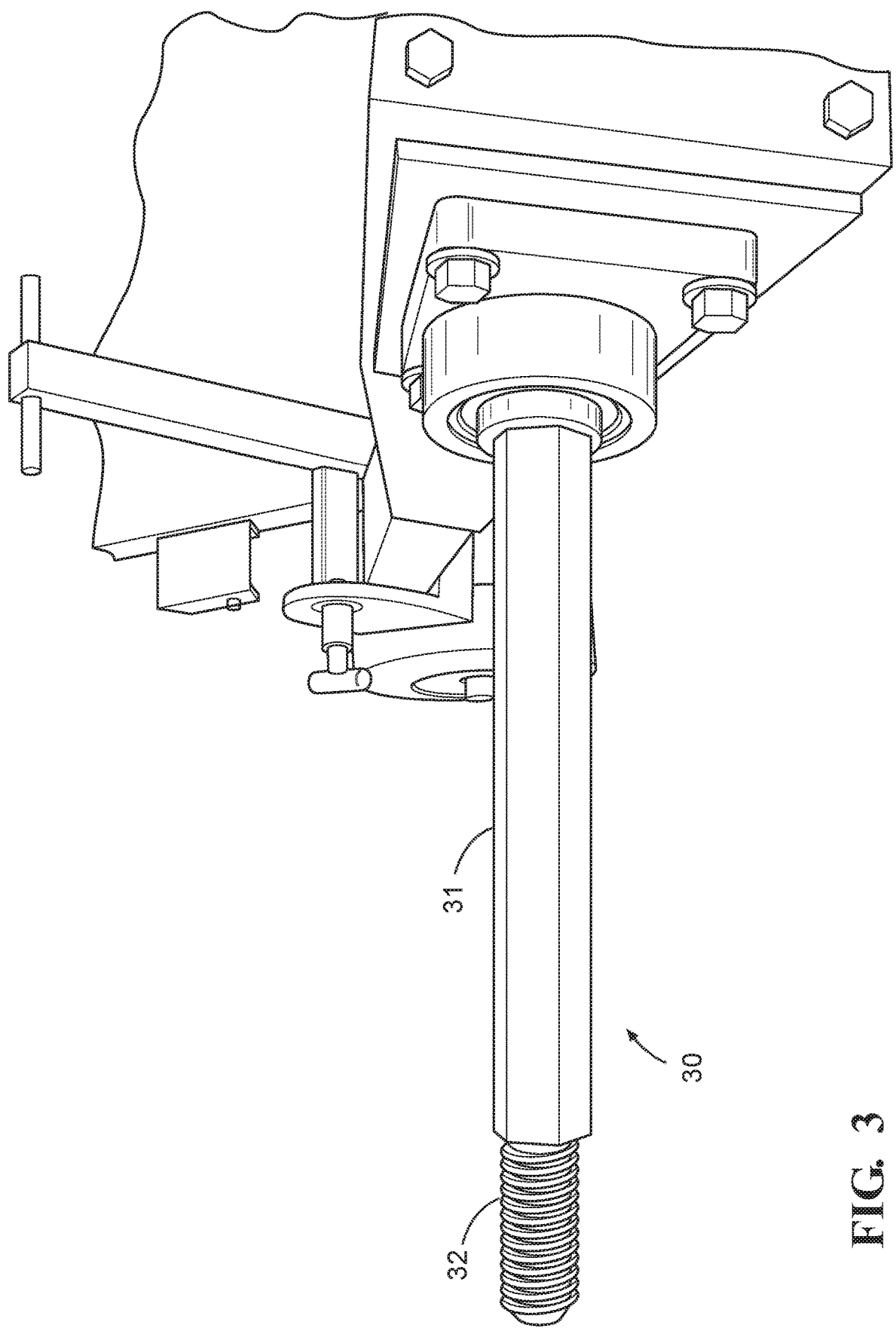
FIG. 3 is a perspective view of a spindle shaft according to one embodiment of the present invention.

FIG. 3 is a perspective view of a spindle shaft according to one embodiment of the present invention.

The spindle shaft 30 is rotatably coupled to the hydraulic motor of the MTRA and includes a noncircular portion 31 which receives a tape removal hub as discussed below. In FIG. 3 the noncircular portion 31 of the spindle shaft 30 is illustrated as having a hexagonal cross-sectional shape. In other embodiments the noncircular portion 31 of the spindle shaft 30 can have other noncircular cross-sectional shapes including polygonal shapes other than hexagonal, other noncircular geometric cross-sectional shapes and non-geometric cross-sectional shapes, combinations thereof, etc. The length of the noncircular portion 31 of the spindle shaft 30 should be at least as long or slightly longer than the width of temporary tape to be removed or a multiple of the width of temporary tape strips to be removed depending on the number of widths of temporary tapes.

A threaded portion 32 of the spindle shaft 30 extends from the end of the noncircular portion 31 and is configured to receive a mechanical element such as a locking or jam nut that will secure the a tape removal hub on the spindle shaft 30. In other embodiments other mechanical elements such as pins, clips, etc. could be used to secure a tape removal hub on the spindle shaft 30 with the necessary receiving grooves, through holes, etc. being provided to secure such pins, clips, etc.

Figure 4:
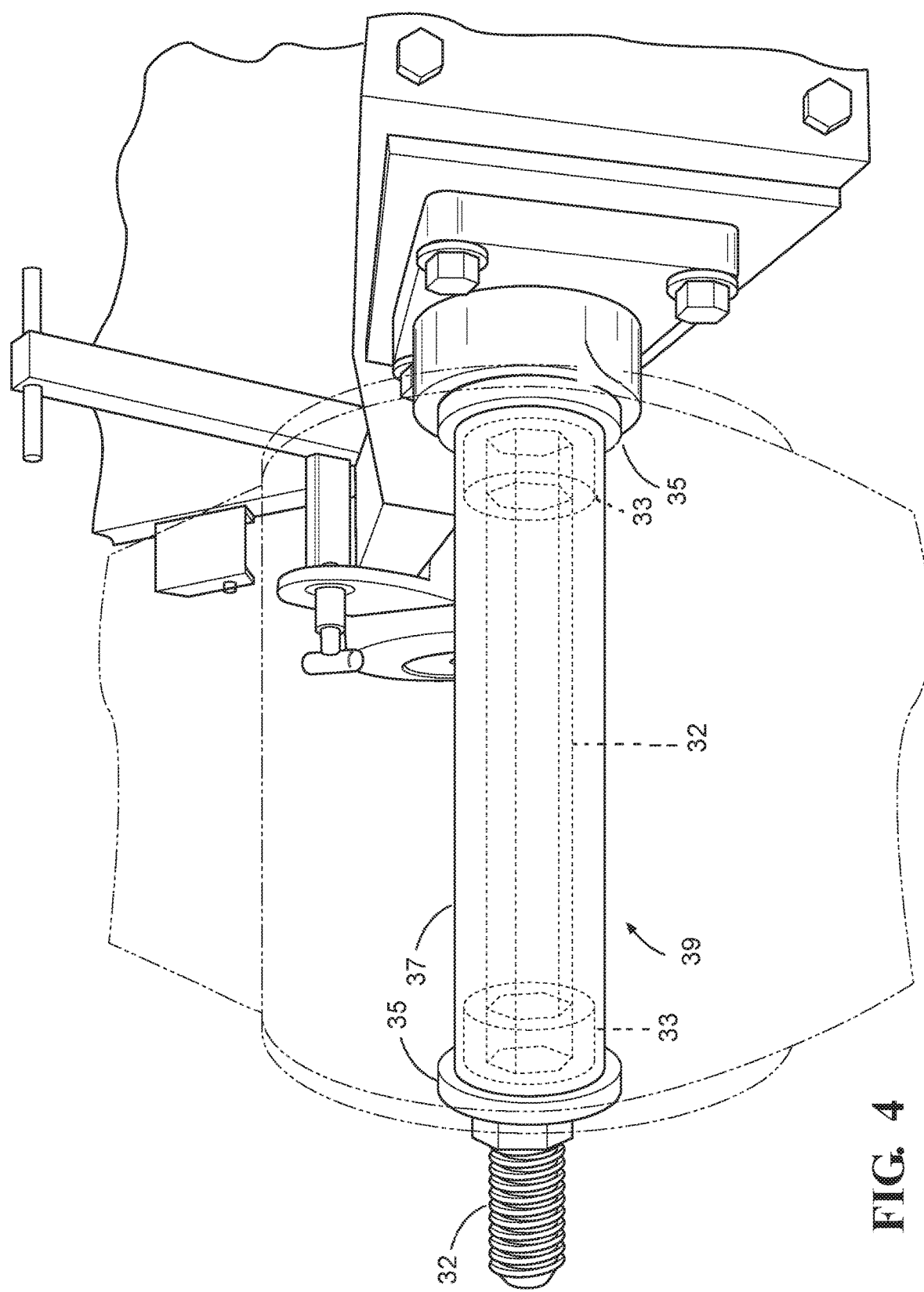
FIG. 4 is a perspective view that shows a tape removal hub positioned on a spindle shaft according to one embodiment of the present invention.

FIG. 4 a perspective view that shows a tape removal hub positioned on a spindle shaft according to one embodiment of the present invention. In FIG. 4 the internal features of the tape removal hub 39 are shown in broken lines. In the embodiment of the tape removal hub 39 shown in FIG. 4 there are hub plugs 33 in both ends of the pipe 37. In other embodiments of the tape removal hub 39 it has been determined that only one hub plug 33 needs to be provided in the inner end (closes to the base of the spindle shaft 30) of the pipe 37. In FIG. 4 the flanges 35 of the hub plugs 33 are depicted as having a slightly larger diameter that the outside diameter of pipe 37. As discussed herein in other embodiments the flanges 35 of the hub plugs 33 can have the same or larger diameters than the outside diameters of the pipes 37 into which they are inserted. Otherwise the diameter of the flanges 35 and be slightly smaller than the inside diameter of the pipes 37 so as to be completely received in the pipes 37. It is also to be understood that spacer plates or other mechanical fittings could be placed on opposite ends of the tape removal hub 33 when secured on the spindle shaft 30.

Figure 5:
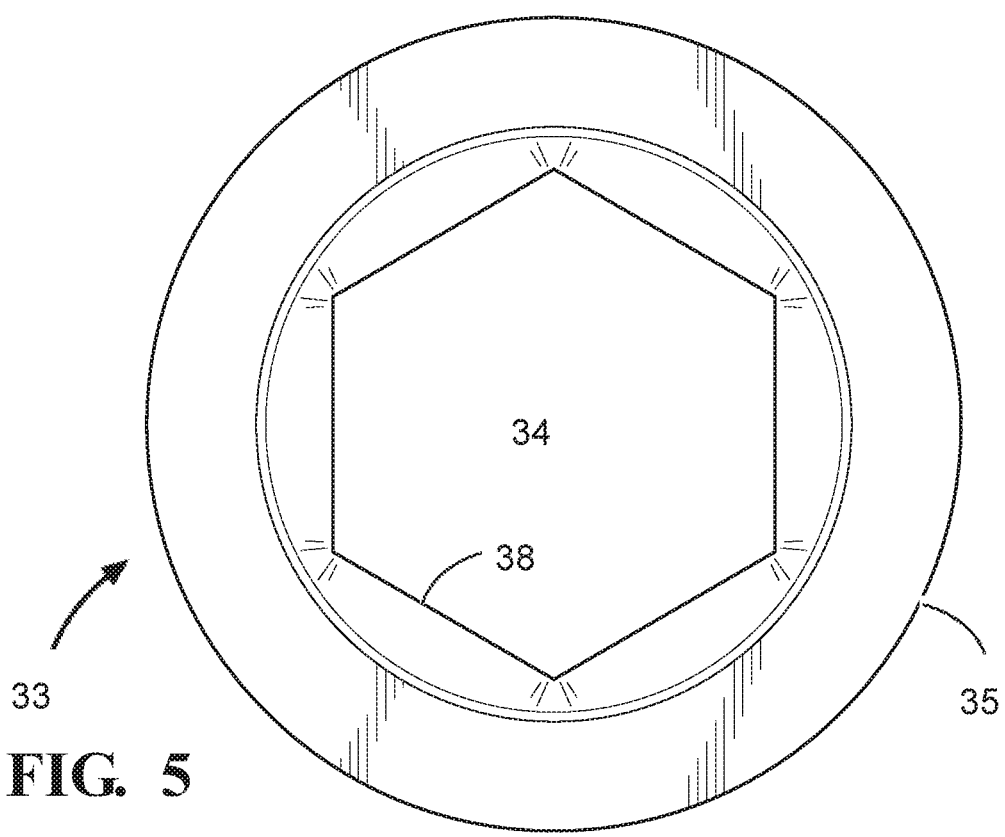
FIG. 5 is an outer end view of a hub plug according to one embodiment of the present invention
Figure 6:
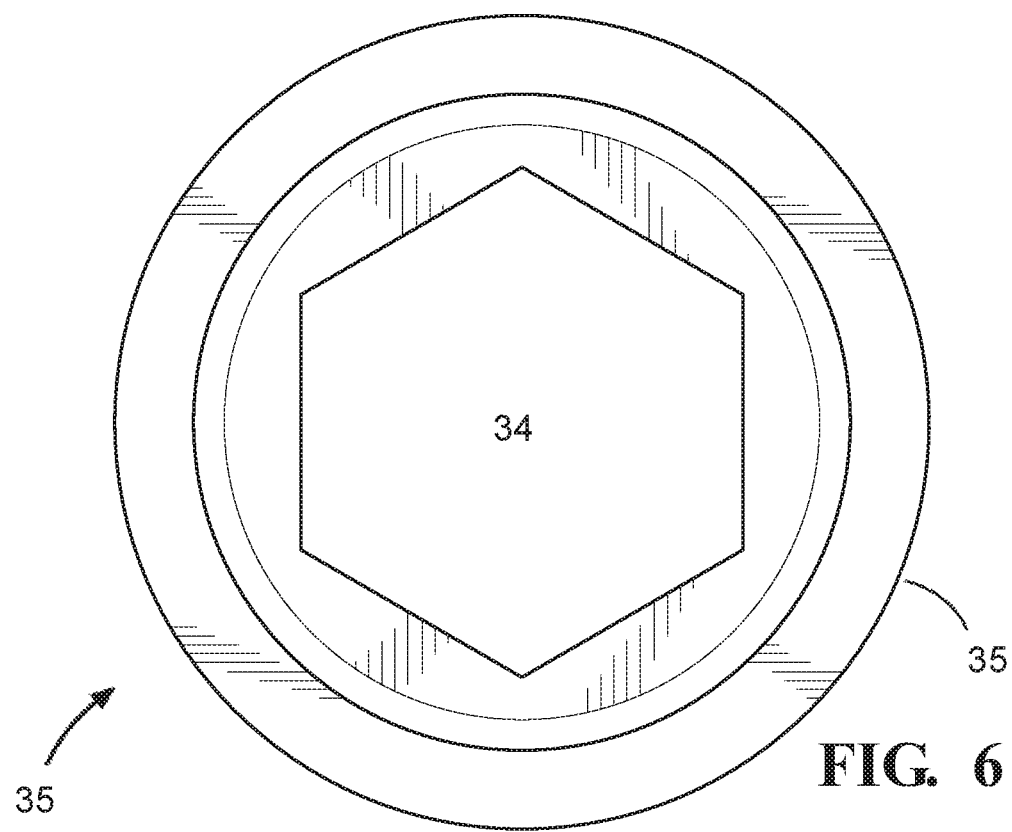
FIG. 6 is an inner end view of the hub plug of FIG. 5.

FIG. 5 is an outer or flange end view of a hub plug according to one embodiment of the present invention. FIG. 6 is an inner end view of the hub plug of FIG. 5.

Figure 7:
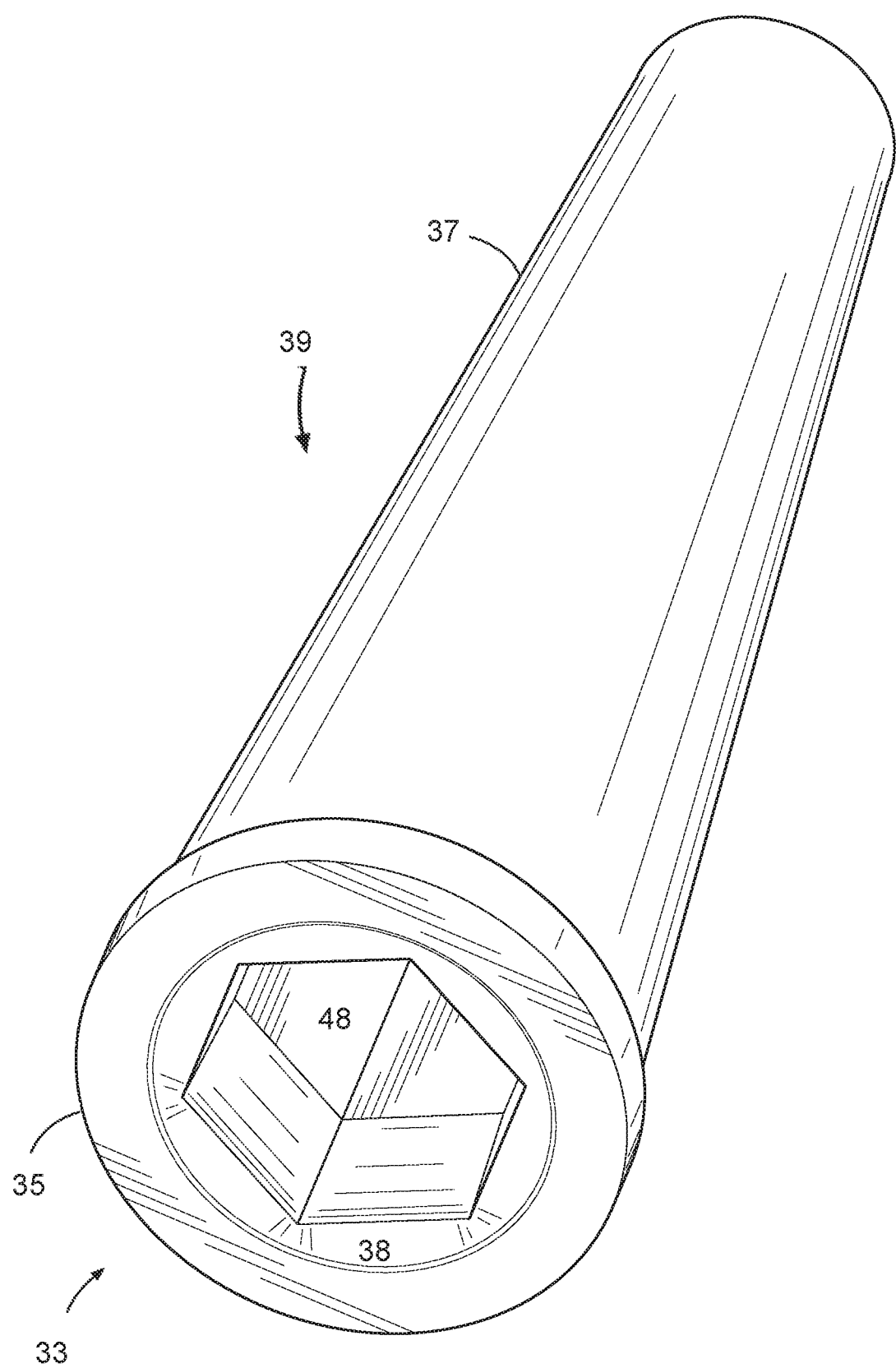
FIG. 7 is a perspective view of a tape removal hub according to one embodiment of the present invention that comprises a hub plug and a length of pipe into which the hub plug is inserted.

The hub plug 33 depicted in FIGS. 5 and 6 has a circular outer surface and a through bore 34 that is complementary shaped to the noncircular portion 31 of the spindle shaft 30 so as to be received on the noncircular portion 31 of the spindle shaft 30. The outer end of the hub plug 33 is provided with a flange 35 that has a larger outer diameter that the non-flanged portion of the hub plug 33. The embodiment of the hub plug 33 depicted in FIGS. 5-7 is designed and configured to be inserted into the end of a length of standard 3-inch or 2-inch i.d. PVC pipe, so that the non-flanged portion of hub plug 33 is received in the PVC pipe and the flange 35 abuts the end of the PVC pipe. As shown in FIG. 7, the outside diameter of the flange 35 can be equal to the outside diameter of pipe 37. The tape removal hubs 39 of the present invention, which include the plug hubs 33 and length of pipe 37, can be used together with the inner and outer retainer discs disclosed in U.S. Pat. No. 10,112,794, and stored in a core caddy provided on the MTRA. If desired, the flange 35 can be provided with a diameter equal or similar to the inner retainer disc described in U.S. Pat. No. 10,112,794 and thereby replace the inner retainer disc if desired. Reference herein to "pipe" is intended to encompass tubes, conduits, and other similar hollow cylindrical structures. In further embodiments, the tape removal hubs can be a single piece, solid cylindrical structure with the noncircular through bore 34 extending there through and without separate hub plugs. In even further embodiments, the tape removal hubs can be single piece elongated structures that have an outer surface having the same or similar shape as the noncircular through bores. For example, the tape removal hubs can have the shapes of noncircular tubes with uniform or varying wall thicknesses.

As shown in FIGS. 5 and 7 the peripheral edge 38 of the through bore 34 can be beveled so as to aid in aligning the tape removal hub 39 with the spindle shaft 30 when inserting the tape removal hub 39 over the spindle shaft 30.

FIG. 7 is a perspective view of a tape removal hub according to one embodiment of the present invention that comprises a hub plug and a length of pipe into which the hub plug is inserted.

FIG. 7 (and FIG. 4) shows how the hub plug 33 is inserted into a length of PVC pipe 37 to form the tape removal hub 39. The depth to which the hub plug 33 is inserted into the PVC pipe 37 can range from about ¾ to about 2 inches or more as necessary to ensure the hub plug 33 does not rotate within the pipe 37 where secured therein. As shown, the flange 35 abuts the end of the PVC pipe 37. The hub plug 33 can be secured inside the PVC pipe by a suitable PVC cement. In further embodiments the hub plug 33 can be secured inside the PVC pipe by any suitable mechanical fastener(s) such as a screw(s) or pin(s). Here is it noted that the hub plug 33 can be molded and/or machined from PVC or similar material which will allow the use of a PVC cement to secure the hub plug 33 securely inside the PVC pipe 37. While the flange 35 is useful for preventing the hub plug 33 from being positioned too far into the PVC pipe 37, it is within the scope of the present invention to exclude the flange 35 structure and merely align the end of a non-flanged hub plug 33 with the end of a length of PVC pipe i.e. so that the hub plug 33 is inserted fully within the pipe 37. Further while the use of PVC materials are exemplified and are believed to allow for molding and/or machining of the hub plugs with a reasonable manufacturing cost in mind, other materials could be used to make the hub plugs and other pipes than PVC pipes could be used if desired. In further embodiments the hub plugs, including the solid cylindrical tape removal hubs discussed above, or single piece tape removal hubs with a pipe portion and one or more hub plug integrally formed therewith, or the noncircular tube shaped tape removal hubs discussed above can be 3-D printed or molded from various materials.

Figure 8:
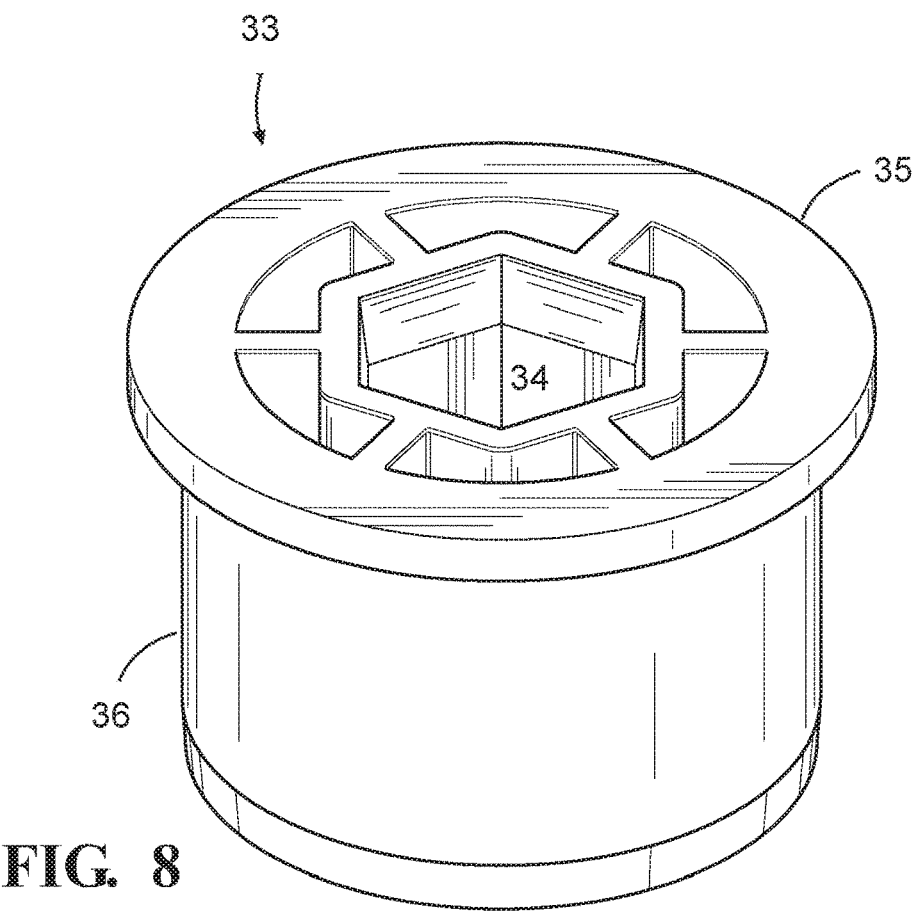
FIG. 8 is a perspective view of a hub plug according to another embodiment of the present invention.
Figure 9:
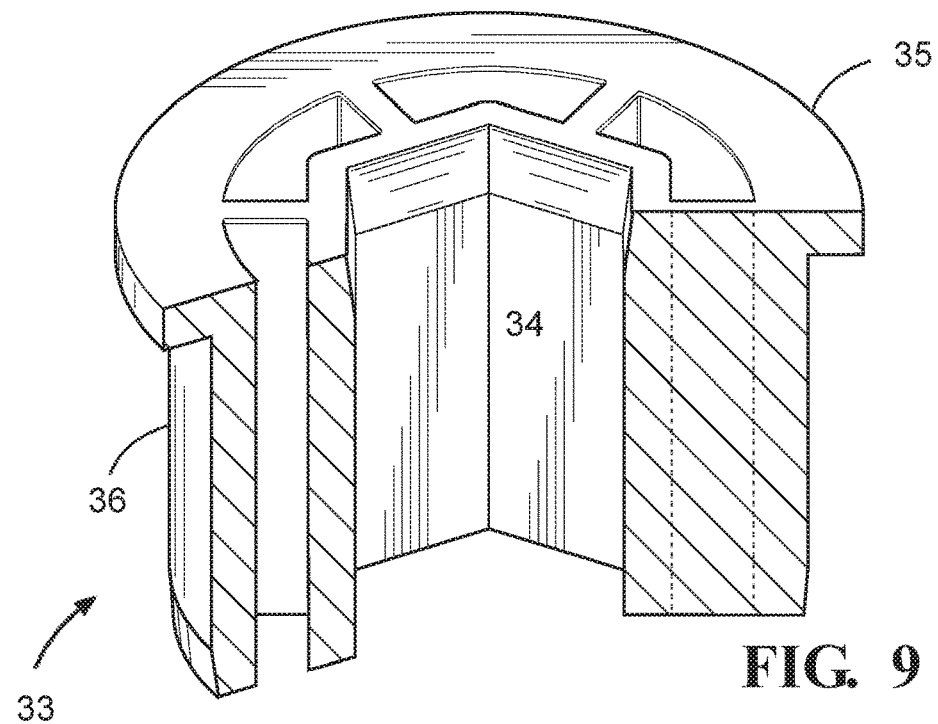
FIG. 9 is a cross-sectional view of the hub plug of FIG. 8.
Figure 10:
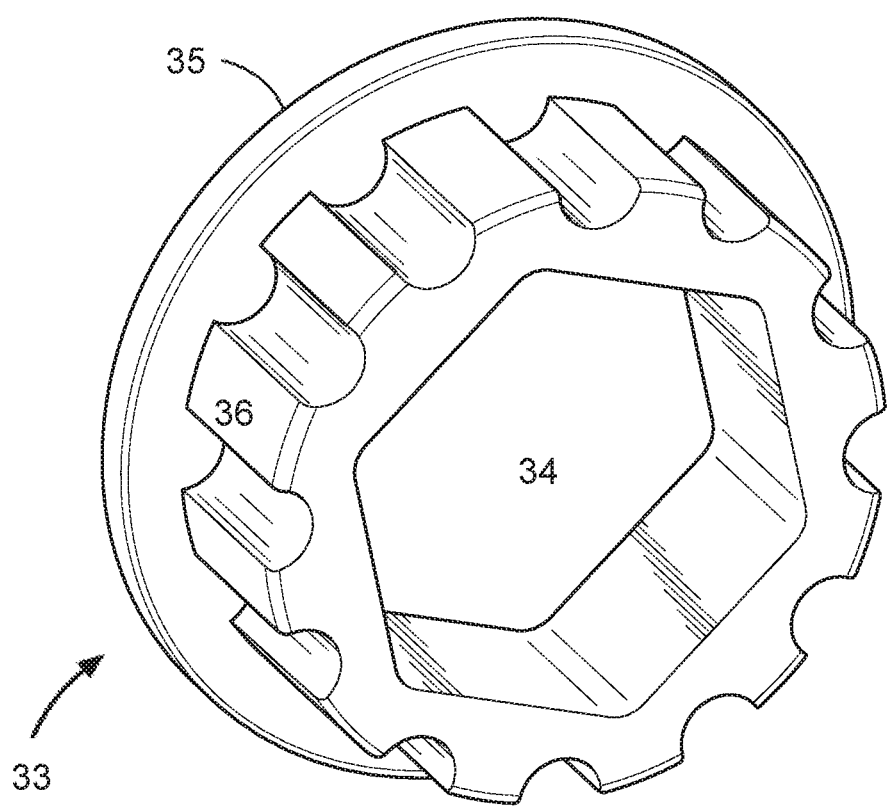
FIG. 10 is a perspective view of a hub plug according to yet a further embodiment of the present invention.

FIG. 8 is perspective view of a hub plug according to another embodiment of the present invention. FIG. 9 is a cross-sectional view of the hub plug of FIG. 8. FIG. 10 is a perspective view of a hub plug according to yet a further embodiment of the present invention.

The hub plugs of FIGS. 8-10 illustrate designs that can be injection molded and are to be understood as being non-limited designs or designs that can be further modified by those skilled in the art. As shown, each design is provided with a flange 35 that will allow the hub plugs to be properly seated in a pipe 37 (as illustrated in FIGS. 4 and 7). Further each design has an outer wall 36 having a surface that is designed to fit against the inner surface of a pipe or tube and be affixed thereto by a suitable cement, glue, mechanical fastener, etc. Also each design provides a noncircular bore 34 that is complementary shaped to the noncircular portion 31 of the spindle shaft 30 upon which a tape removal hub comprising the hub plug will be received for use in removing temporary tape.

In the embodiment of the hub plug of FIGS. 8 and 9 the structure defining the noncircular bore 34 is a spaced apart from the flange 35 and outer wall 36 by a series of reinforcing structures and the outer wall 36 is continuous. In the embodiment of the hub plug of FIG. 10 the outer wall 36 is not continuous, but rather includes a series of parallel, longitudinal grooves. As can be appreciated various features of the hub plug designs of FIGS. 9-10 are designed to reduce material while maintaining sufficient mechanical strength and affording the ability to mold (e.g. injection mold, etc.) the hub plugs.

Experimental Testing

During the course of the present invention the inventor tested different designs for tape removal hubs and provides a discussion of such tests below.

Functional Take Up Spool Assembly

In this test a latching chuck with a roller cage having a 3 inch roller was tested on applicant's MTRA. This assembly locked a disposable hub as described in applicant's U.S. Pat. No. 10,112,794 tightly such that the core was not able to spin freely about the spool assembly during a tape removal process, However, removal of the spooled up accumulated removed tape from the latching chuck was physically very difficult, time consuming and demoralizing for the operator. During a tape removal process while testing the latching chuck, the locking rings frequently split with a catastrophic release of the rollers, thereby rendering the MTR inoperable and requiring repair with parts that are expensive and a repair period that was time consuming.

Spindle Cones

In this test spindle cones of the type used in paper processing were tested by pressing opposed spindle cones on opposite ends of a length of PVC pipe. It was found that the cones needed to be imbedded into the PVC pipe tight enough so that the pipe would not spin about the spindle shaft rotating the assembly. The difficulty in this test was that the operator often did not tighten the jam nut adequately. Also, as tape spooled and built up on the PVC pipe during a tape removing process, the accumulated tape would press outwardly on the retaining discs forcing the retaining discs on either side outward and causing the spindle cones to become loosened.

Based on testing, including the testing discussed above, the present inventor determined that the tape removal hub disclosed and described herein, when used in combination with a noncircular spool spindle shaft, provides for the efficient removal of temporary tape when used with the MTRA. Further the design of the tape removal hub allows for easy mounting on the spool spindle shaft and easy removal of a used tape removal hub upon which a significant mass of used temporary tape has been spooled. The design of the tape removal hub provides a mechanical sturdy hub that is relatively light in weight, easy to manufacture and economically disposable.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. In a temporary tape removal apparatus that comprises a chassis having fixed and guiding wheels, a boom arm extending outward from the chassis and being movable between up and down and side to side positions, a spool assembly including a rotatable spool assembly for winding used temporary tape thereon mounted on the boom arm, and controllable drive means to rotate the rotatable spool, the improvement wherein the rotatable spool assembly comprises:

a spool spindle shaft having a noncircular shaft portion; and a tape removal hub consisting essentially of a length of hollow pipe or tubing hub and a single hub plug inserted into only one end of the length of hollow pipe or tubing, the hub plug extending only partially into the length of the hollow pipe or tubing, the hub plug having a noncircular through bore formed therein which is complementarily shaped to receive the noncircular shaft portion of the spool spindle shaft, wherein the tape removal hub has a length of 8 inches or less.

2. A temporary tape removal apparatus according to claim 1, wherein the hub plug comprises a radially extending flange on an end thereof.

3. A temporary tape removal apparatus according to claim 2, wherein the flange of the hub plug abuts an end of the pipe or tubing when inserted therein.

4. A temporary tape removal apparatus according to claim 1, wherein a peripheral outer portion of an end of the through bore is beveled.

5. A temporary tape removal apparatus according to claim 1, wherein the spool spindle shaft has a threaded portion that extends beyond the noncircular shaft portion.

6. A temporary tape removal apparatus according to claim 1, wherein the threaded portion of the spool shaft spindle is configured to receive a threaded fastener to secure the tape removal hub on the spool spindle shaft.

7. A temporary tape removal apparatus according to claim 1, wherein the hub plug has a solid structure.

8. A temporary tape removal apparatus according to claim 1, wherein the hub plug is a non-solid structure.

9. A temporary tape removal apparatus according to claim 1, wherein the hub plug has a smooth continuous circular outer surface.

10. An assembly for winding temporary tape on a spool which comprises:
    a rotatable spool spindle shaft having a noncircular shaft portion; and
    a tape removal hub consisting essentially of a length of hollow pipe or tubing and a single hub plug inserted into only one end of the length of hollow pipe or tubing and extending only partially into the length of the hollow pipe or tubing, the hub plug having a noncircular through bore formed therein which is complementarily shaped to receive the noncircular shaft portion of the spool spindle shaft, wherein the tape removal hub has a length of 8 inches or less.

11. An assembly for winding temporary tape on a spool according to claim 10, wherein the hub plug comprises a radially extending flange on an end thereof.

12. An assembly for winding temporary tape on a spool according to claim 11, wherein the flange of the hub plug abuts an end of the pipe or tubing when inserted therein.

13. An assembly for winding temporary tape on a spool according to claim 10, wherein a peripheral outer portion of and end of the through bore is beveled.

14. An assembly for winding temporary tape on a spool according to claim 10, wherein the spool spindle shaft has a threaded portion that extends beyond the noncircular shaft portion.

15. An assembly for winding temporary tape on a spool according to claim 10, wherein the threaded portion of the spool shaft spindle is configured to receive a threaded fastener to secure the tape removal hub on the spool spindle shaft.

16. An assembly for winding temporary tape on a spool according to claim 10, wherein the hub plug has a solid structure.

17. An assembly for winding temporary tape on a spool according to claim 10, wherein the hub plug is a non-solid structure.

18. An assembly for winding temporary tape on a spool according to claim 10, wherein the hub plug has a smooth continuous circular outer surface.

\* \* \* \* \*